(12) United States Patent
Stenzel et al.

(10) Patent No.: US 7,628,971 B2
(45) Date of Patent: Dec. 8, 2009

(54) HIGHLY DISPERSIBLE PRECIPITATED SILICA HAVING A HIGH SURFACE AREA

(75) Inventors: Oleg Stenzel, Cologne (DE); Stefan Uhrlandt, Belle Mead, NJ (US); Hans-Detlef Luginsland, Hoboken, NJ (US); Andre Wehmeier, Huerth (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 12/180,917

(22) Filed: Jul. 28, 2008

(65) Prior Publication Data

US 2008/0293871 A1    Nov. 27, 2008

Related U.S. Application Data

(63) Continuation of application No. 10/523,414, filed as application No. PCT/EP03/08124 on Jul. 24, 2003, now abandoned.

(30) Foreign Application Priority Data

Aug. 3, 2002   (DE) ................. 102 35 561
Jul. 4, 2003   (DE) ................. 103 30 222

(51) Int. Cl.
    $C01B\ 33/113$    (2006.01)
    $C01B\ 33/12$    (2006.01)

(52) U.S. Cl. ..................... 423/335
(58) Field of Classification Search ........... 423/335, 423/339
See application file for complete search history.

(56) References Cited

U.S. PATENT DOCUMENTS

| | | | |
|---|---|---|---|
| 5,705,137 A | | 1/1998 | Goerl et al. |
| 5,846,506 A | * | 12/1998 | Esch et al. ............. 423/338 |
| 5,859,117 A | | 1/1999 | Goerl et al. |
| 6,180,076 B1 | | 1/2001 | Uhrlandt et al. |
| 6,268,424 B1 | | 7/2001 | Blume et al. |
| 6,613,309 B2 | | 9/2003 | Uhrlandt et al. |
| 6,702,887 B2 | | 3/2004 | Uhrlandt et al. |
| 2003/0003040 A1 | | 1/2003 | Lindner et al. |
| 2003/0059380 A1 | | 3/2003 | Uhrlandt et al. |
| 2003/0082090 A1 | | 5/2003 | Blume et al. |

* cited by examiner

*Primary Examiner*—Timothy C Vanoy
*Assistant Examiner*—Serena L Hanor
(74) *Attorney, Agent, or Firm*—Oblon, Spivak, McClelland, Maier & Neustadt, L.L.P.

(57) ABSTRACT

The present invention relates to a highly dispersible silica which has a high surface area, a process to manufacture the aforesaid silica and its use as a tire filler for utility vehicles, motor cycles and high speed vehicles.

10 Claims, 1 Drawing Sheet

$$WK = \frac{\text{peak level of non-degradable particles (B)}}{\text{peak level of degraded particles (A)}}$$

A' = range from 0 to < 1.0 μm
B' = range of 1.0 μm – 100 μm

Fig. 1

$$WK = \frac{\text{peak level of non-degradable particles (B)}}{\text{peak level of degraded particles (A)}}$$

A' = range from 0 to < 1.0 μm

B' = range of 1.0 μm – 100 μm

HIGHLY DISPERSIBLE PRECIPITATED SILICA HAVING A HIGH SURFACE AREA

The present invention relates to highly dispersible silica which has a high surface area, a process to manufacture the aforesaid silica and its use as a tire filler for utility vehicles, motor cycles and high speed vehicles.

The use of precipitated silicas in elastomer mixtures such as tires has been known for some time. High demands are placed on silicas used in tires. They should be light and easily dispersible in rubber, bond well with the polymer chains in the rubber and the other fillers and have a high carbon black-like abrasion resistance. Apart from the dispersibility of silica, among other things, the specific surface areas (BET or CTAB) and the oil absorption capacity (DBP) are important. The surface properties of silicas substantially determine their possible application, or specific applications of a silica (e.g. carrier systems or fillers for elastomer mixtures) require certain surface properties.

U.S. Pat. No. 6,013,234 thus discloses the manufacture of precipitated silica with a BET and CTAB surface area respectively of 100 to 350 $m^2/g$. This silica is particularly suited to incorporation in elastomer mixtures, where the BET/CTAB ratios are between 1 and 1.5. In EP 0937755 various precipitated silicas are disclosed which have a BET surface area of approx. 180 to approx. 430 $m^2/g$ and a CTAB surface area of approx. 160 to 340 $m^2/g$. These silicas are especially suitable as carrier materials and have a BET to CTAB ratio of 1.1 to 1.3. EP 0647591 discloses a precipitated silica which exhibits a ratio between BET and CTAB surface areas of 0.8 to 1.1, in which these surface area characteristics can assume absolute values of up to 350 $m^2/g$. In EP 0643015 a precipitated silica is presented, which can be used as an abrasive and/or thickening component in toothpastes, which has a BET surface area of 10 to 130 $m^2/g$ and a CTAB surface area of 10 to 70 $m^2/g$, that is a BET to CTAB ratio of approx. 1 to 5.21.

Silicas which are especially suitable as fillers for elastomer mixtures, here in particular passenger vehicle tires, are described in EP 0901986 with the following characteristics.

| | |
|---|---|
| BET surface area | 120-300 $m^2/g$ |
| CTAB surface area | 100-300 $m^2/g$ |
| Ratio BET/CTAB | 0.8-1.3 |
| Sears number $V_2$ (consumption 0.1 N NaOH) | 6-25 ml/(5 g) |
| DBP number | 150-300 g/100 g |
| WK coefficient | <3.4 |
| Particle size of the decomposed particles | <1.0 μm |
| Particle size of the non-decomposed particles | 1.0-100 μm |

Very different demands are placed on vehicle tires depending on the area of application. In a very rough subdivision into passenger vehicle tires and utility vehicle tires the following minimum differences can be observed:

| | Requirements for passenger vehicle tires (guide values) | Requirements for utility vehicle tires (guide values) |
|---|---|---|
| Main component of the tread | E and L-SBR/BR blends | NR, in some cases as a BR blend |
| Possibility of retreading | unimportant | min. 3 times |
| Running performance | 40 000 km in Europe 64 000 km in the USA | 3 × 200 000 km |
| Highest speed | 160-240 km/h and more | 100 km/h (max. 140 km/h) |
| Filling pressure | 2.2 bar | 8.5 bar |
| Load bearing capacity per axle | 1 000 kg | 6 300 kg (single tire equipment) |
| Off-road use | low | high |
| Heat Build Up | low | very important |
| Rolling resistance | very important | important |
| Tensile strength | low | important |

Passenger vehicles in terms of the present invention are vehicles for transporting passengers, mainly for private use, that is, not utility vehicles such as delivery vehicles. This does not include vehicles which are normally operated at high speeds, even if this could apply according to the form of construction as a passenger vehicle. These vehicles also have other requirements on tires as those passenger vehicle tires listed in the table.

Tires for motor cycles and high speed passenger vehicles must also withstand high loads at high speeds and exhibit very good traction in wet and dry road conditions. However, good traction should not be associated with increased wear and high rolling resistance.

The different requirements that vehicles place on tires have corresponding effects on the fillers that are used in the tires. The long established admixture of silicas and organosilicon compounds as a filler system in passenger vehicle tires leads to reduced rolling resistance, improved traction and less abrasion. It would be desirable to transfer these improved properties to tires for utility vehicles such as trucks, as a reduced rolling resistance is also associated with lower fuel consumption. However, the different requirements of the above-mentioned vehicles on their tires inevitably lead to different requirements for the fillers that are used.

It has been shown that the silicas used in passenger vehicle tires are unsuitable for use in truck tires, motor cycle tires and high speed tires for passenger vehicles due to the different requirements profile. The task of the present invention was therefore to provide precipitated silicas with a requirements profile especially coordinated to these vehicles. Experts know that when active carbon black is used as a tire filler, the increase in surface area improves the reinforcement and hence the abrasion resistance of the tire. But the use of carbon blacks with high surface areas (CTAB surface area>130 $m^2/g$) is limited in such filled mixtures due to the greatly increasing heat build-up (hysteresis behavior described and measurable according to DIN 53535, or according to the references named in this DIN).

It has now been found that a precipitated silica with a high CTAB surface area is especially good as a filler in elastomer mixtures for utility vehicle tires, and is suitable for motor cycle tires and tires for high speed passenger vehicles.

The subject of the present invention is thus precipitated silicas with a BET surface area of 170-380 $m^2/g$, a CTAB surface area of $\geq$170 $m^2/g$, a DBP number of 305-400 g/(100 g) and a Sears number $V_2$ of 23-35 ml/(5 g).

The greatly reduced hysteresis when silicas according to the present invention are used as a filler also allows surface areas to be implemented, which could not be achieved with carbon black due to the higher hysteresis, and thus to an improvement in rolling resistance.

The precipitated silicas according to the present invention can exhibit a maximum CTAB surface area of 300 m$^2$/g, in particular a CTAB surface area of 170-220 m$^2$/g or 245-300 m$^2$/g.

The precipitated silicas according to the present invention can exhibit characteristics independent of one another in the following preferred ranges:

| | |
|---|---|
| DBP absorption | 335-380 g/(100 g), in particular 335-360 g/(100 g) |
| WK coefficient | ≦3.4, preferably ≦3.0, in particular ≦2.5 |
| Sears number V$_2$ | 23-35, preferably 26-35, in particular 30-35 ml/(5 g) |
| BET | 170-350 m$^2$/g, preferably 200-300 m$^2$/g, in particular 200-250 m$^2$/g. |

Figure 1:
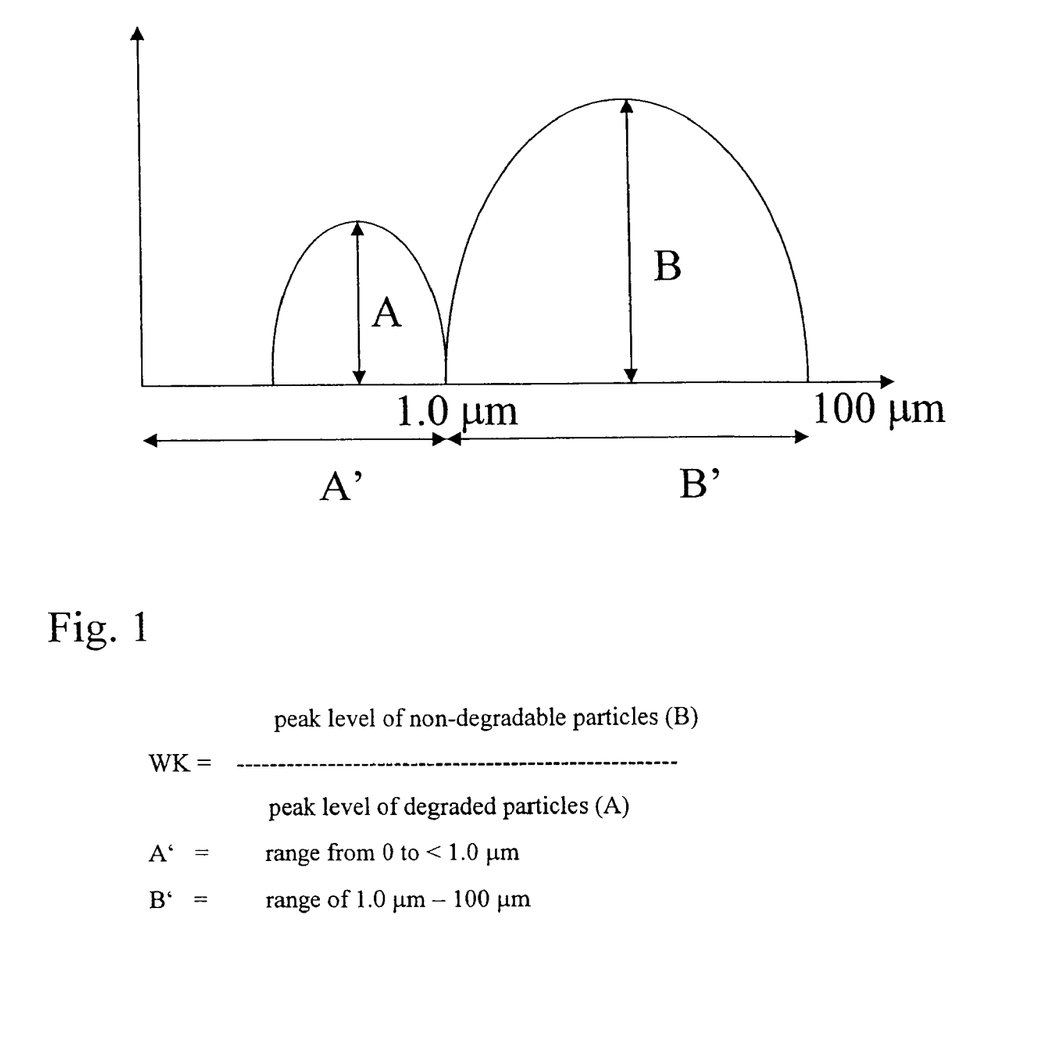
FIG. 1 is a schematic illustration of the values required to calculate the WK coefficients.

The WK coefficient is defined as the ratio of the peak height of particles that are not decomposed by ultrasound in the size range of 1.0-100 μm to the peak height of the decomposed particles in the size range of <1.0 μm (see FIG. 1).

EP 1186629 discloses silicas with high CTAB surface areas which are suitable as filler for tires. Statements about the Sears number and thus about the concentration of hydroxyl groups on the surface of the silica are not contained in EP 1186629.

Another object of the present invention is a process for manufacture of a precipitated silica with a

| | |
|---|---|
| BET surface area | 170-380 m$^2$/g |
| CTAB surface area | ≧170 m$^2$/g |
| DBP number | 305-400 g/(100 g), preferably 310-350 g/(100 g) |
| Sears number V$_2$ | 23-35 ml/(5 g) | where
a) an aqueous solution of an alkali or alkaline-earth silicate and/or an organic and/or inorganic base with pH≧9 is present
b) water glass and acidifier especially sulfuric acid are metered into this solution with stirring at 55-95° C. for 10-120, preferably 10-60 minutes, simultaneously,
c) metering is stopped for 30-90 minutes while the temperature is maintained, and
d) water glass and acidifier are metered into this vessel with stirring at this temperature for 20-120, preferably 20-80 minutes, simultaneously
e) acidified with acidifier to a pH value of approx. 3.5 and
f) filtered and dried.

Silicas that are produced according to the present invention can exhibit characteristics in the above-mentioned preferred ranges.

The initial solution can be approx. 20, 30, 40, 50, 60, 70, 80 or 90% of the final volume of the precipitation. The basic compounds that are added are especially chosen from the group of alkali hydroxides, alkaline-earth hydroxides, alkali carbonates, alkali hydrogen carbonates and alkali silicates. Preferably water glass or sodium hydroxide solution are used. The pH value of the metered quantity is ≧9, preferably between 9.0 and 12, particularly preferably between 9 and 10.5.

Optionally, organic or inorganic salts can be also be added during steps b) and d). This can be carried out in solution or as a solid, in each case continuously while the water glass and the acidifier are being added or as a batch addition. It is also possible to dissolve the salts in one or both components and then add them with these components.

Preferably alkali or alkaline-earth salts are used as inorganic salts. In particular combinations of the following ions can be used:

Li$^+$, Na$^+$, K$^+$, Rb$^+$, Be$^{2+}$, Mg$^{2+}$, Ca$^{2+}$, Sr$^{2+}$, Ba$^{2+}$, H$^+$, F$^-$, Cl$^-$, Br$^-$, I$^-$, SO$_3^{2-}$, SO$_4^{2-}$, HSO$_4^-$, PO$_3^{3-}$, PO$_4^{3-}$, NO$_3^-$, NO$_2^-$, CO$_3^{2-}$, HCO$_3^-$, OH$^-$, TiO$_3^{2-}$, ZrO$_3^{2-}$, ZrO$_4^{4-}$, AlO$_2^-$, Al$_2$O$_4^{2-}$, BO$_4^{3-}$.

The salts of methanoic, acetic and propionic acids are suitable as organic salts. The named alkali or alkaline-earth ions are named as a cation. The concentration of these salts in the metered solution can be between 0.01 and 5 mol/l. Na$_2$SO$_4$ is preferably used as an inorganic salt. It is possible to add the acidifier in steps b) and d) in the same or in a different manner, that is with the same or with different concentrations and/or metering speeds.

Similarly, the water glass can also be added to the reaction in steps b) and d) in the same or in a different manner.

In a special embodiment of the invention in steps b) and d) the acidifier and water glass components are added in such a way that the metering rate in step d) is 125-140% of the metering rate in step b), where the components in the two steps are each added in the corresponding concentration. Preferably the components are added at the same concentration and at the same rate.

Apart from water glass (sodium silicate solution) other silicates such as potassium or calcium silicate can also be used. Sulfuric acid can be used as an acidifier, but other acidifiers such as HCl, HNO$_3$, H$_3$PO$_4$, or CO$_2$ can also be used.

Filtration and drying of the silicas according to the present invention are known to the expert and can be gleaned from e.g. the above-mentioned documents. Preferably the precipitated silica is dried in an air-lift drier, a spray drier, a rack drier, a conveyor drier, a rotary drier, a flash drier, a spin flash drier, or a nozzle drier. These drying variants also include operation with an atomizer, a single or double nozzle, or an integrated fluidized bed. Preferably the precipitated silica according to the present invention has a particle form with an average diameter of above 15 μm, preferably above 80 μm, particularly preferably above 200 μm after the drying step. The average particle diameter is defined such that 50% by weight of the particles exhibit a larger or smaller diameter.

After the drying step the silica can also be granulated with a roll compactor. In this case the average particle diameter is ≧1 mm.

Preferably the silica according to the present invention is used in tires for utility vehicles, trucks, high speed passenger vehicles and motor cycles.

Utility vehicles in terms of the present invention are all vehicles which have high demands in regard to running performance and wear placed on their tires. In regard to the requirements for high running performance, especially tires for buses, trucks and/or delivery vehicles and trailers are mentioned. In regard to wear resistance such as cleat tear resistance, chipping, and chunking, tires for off-road vehicles, construction and agricultural machines, mining vehicles and tractors are mentioned here. Meant are especially vehicles with an axle load of more than 1 metric ton or with a permissible total weight of 2, 4, 7.5, or 15 metric tons. The silicas according to the present invention can especially be used in traction tires for heavy trucks or their trailers. Vehicles such as this often have axle loads of more than 5 metric tons and tire diameters of more than 17".

Tires for utility vehicles and trucks are classified according to speed. The silicas according to the present invention are especially suitable for (truck) tires that are permitted for speeds between 80 and 140 km/h and which bear the symbols F, G, J, K, L, M or N.

Tires for high speed vehicles (motor cycle or passenger car) are those which are approved for speeds above 180 km/h. These are (passenger vehicle) tires with the symbols S, T, U, H, V, W, Y and ZR.

Another subject of the invention are elastomer mixtures, vulcanizable rubber mixtures and/or other vulcanizates containing the silicas according to the present invention, such as molded bodies like pneumatic tires, tire treads, cable sheaths, hoses, drive belts, conveyor belts, roller covering, tires, shoe soles, sealing rings and damping elements.

The silicas according to the present invention can also be used in all areas of application in which silicas are normally used, such as in battery separators, as anti-blocking agents, as matting agents in coatings and colorings, as a carrier for agricultural products and foodstuffs, in coatings in printing inks, in fire extinguisher powder, in plastics, in the area of non impact printing, in paper pulp, in the area of personal care and special applications.

When used in the area of non impact printing, e.g. in inkjet processes, the silicas according to the present invention can be used in printing inks to thicken or prevent splashing and blotting, in paper as a filler, a coating pigment, carbon paper, thermo paper, in thermo-sublimation to prevent printing ink blotting, to improve image and contrast, to improve spot focus and color brilliance.

Use in personal care is deemed to mean the use of the silicas according to the present invention as fillers or thickening agents. e.g. in the area of pharmacy or personal hygiene.

The silica according to the present invention can be optionally modified with silanes or organosilanes of formulae I to III $$[SiR^1_n(RO)_r(Alk)_m(Ar)_p]_q[B] \quad (I),$$

$$SiR^1_n(RO)_{3-n}(Alkyl) \quad (II),$$

or $$SiR^1_n(RO)_{3-n}(Alkenyl) \quad (III),$$

with the following meanings

| | |
|---|---|
| B: | —SCN, —SH, —Cl, —NH$_2$, —OC(O)CHCH$_2$, —OC(O)C(CH$_3$)CH$_2$ (if q = 1) or —S$_w$— (if q = 2), whereby B is chemically bonded to Alk, |
| R and R$^1$: | an aliphatic, olefinic, aromatic or aryl aromatic radical with 2 to 30 C atoms, which can optionally be substituted by the following groups: hydroxyl, amino, alcoholate, cyanide, thiocyanide, halogen, sulfonic acid, sulfonic acid ester, thiol, benzoic acid, benzoic acid ester, carbonic acid, carbonic acid ester, acrylate, methacrylate, organosilane radical, where R and R$^1$ can have an identical or different meaning or substitution, |
| n: | 0, 1 or 2, |
| Alk: | a divalent unbranched or branched hydrocarbon radical with 1 to 6 carbon atoms, |
| m: | 0 or 1 |
| Ar: | an aryl radical with 6 to 12 C atoms, preferably 6 C atoms, which can be substituted by the following groups: hydroxyl, amino, alcoholate, cyanide, thiocyanide, halogen, sulfonic acid, sulfonic acid ester, thiol, benzoic acid, benzoic acid ester, carbonic acid, carbonic acid ester, organosilane radical, |
| p: | 0 or 1 with the proviso that p and n do not simultaneously mean 0, |
| q: | 1 or 2, |
| w: | a number from 2 to 8, |
| r | 1, 2 or 3,with the proviso that r + n + m + p = 4, |
| Alkyl: | a monovalent unbranched or branched saturated hydrocarbon radical with 1 to 20 carbon atoms, preferably 2 to 8 carbon atoms, |
| Alkenyl: | a monovalent unbranched or branched unsaturated hydrocarbon radical with 2 to 20 carbon atoms, preferably 2 to 8 carbon atoms. |

The silica according to the present invention can also be modified with organosilicone compounds having the composition $SiR^2_{4-n}X_n$ (with n=1, 2, 3), $[SiR^2_xX_yO]_z$ (with $0 \leq x \leq 2$; $0 \leq y \leq 2$; $3 \leq z \leq 10$, with x+y=2), $[SiR^2_xX_yN]_z$ (with $0 \leq x \leq 2$; $0 \leq y \leq 2$; $3 \leq z \leq 10$, with x+y=2), $SiR^2_nX_mOSiR^2_oX_p$ (with $0 \leq n \leq 3$; $0 \leq m \leq 3$; $0 \leq o \leq 3$; $0 \leq p \leq 3$, with n+m=3, o+p=3), $SiR^2_nX_mNSiR^2_oX_p$ (with $0 \leq n \leq 3$; $0 \leq m \leq 3$; $0 \leq o \leq 3$; $0 \leq p \leq 3$, with n+m=3, o+p=3), $SiR^2_nX_m[SiR^2_xX_yO]_z SiR^2_oX_p$ (with $0 \leq n \leq 3$; $0 \leq m \leq 3$; $0 \leq x \leq 2$; $0 \leq y \leq 2$; $0 \leq o \leq 3$; $0 \leq p \leq 3$; $1 \leq z \leq 10000$, with n+m=3, x+y=2, o+p=3). These compounds can be linear, cyclic and branched silane, silazane and siloxane compounds. $R^2$ can be alkyl and/or aryl radicals with 1 to 20 carbon atoms, which can be substituted by functional groups such as the hydroxyl group, the amino group, polyethers, such as ethylene oxide and/or propylene oxide, and halogenide groups, such as fluoride. $R^2$ may also contain groups such as alkoxy, alkenyl, alkinyl and aryl groups and sulfurous groups. X can be reactive groups such as silanole, amino, thiol, halogenide, alkoxy, alkenyl and hydride groups.

Linear polysiloxanes having the composition $SiR^2_nX_m[SiR^2_xX_yO]_z SiR^2_oX_p$ (with $0 \leq n \leq 3$; $0 \leq m \leq 3$; $0 \leq x \leq 2$; $0 \leq y \leq 2$; $0 \leq o \leq 3$; $0 \leq p \leq 3$; $1 \leq z \leq 10000$, with n+m=3; x+y=2; o+p=3) are preferably used, in which $R^2$ is preferably represented by methyl.

Polysiloxanes having the composition $SiR^2_nX_m[SiR^2_xX_yO]_z SiR^2_oX_p$ (with $0 \leq n \leq 3$; $0 \leq m \leq 1$; $0 \leq x \leq 2$; $0 \leq y \leq 2$; $0 \leq o \leq 3$; $0 \leq p \leq 1$; $1 \leq z \leq 1000$, with n+m=3, x+y=2, o+p=3) are particularly preferably used, in which $R^2$ is preferably represented by methyl.

Modifying the optionally granulated, ungranulated, ground and/or unground precipitated silica with one or more of the above-mentioned organosilanes can be undertaken in mixtures of 0.5 to 50 parts, relative to 100 parts precipitated silica, in particular 1 to 15 parts, relative to 100 parts precipitated silica, whereby reaction between precipitated silica and organosilane can be carried out during production of the mixture (in situ) or outside of production by spraying and subsequent tempering of the mixture, by mixing of the silane and the silica suspension with subsequent drying and tempering (for example according to DE 3437473 and DE 19609619) or in accordance with the process described in DE 19609619 or DE-PS 4004781.

All bifunctional silanes, which can on the one hand effect coupling to the filler containing silanole groups and on the other hand coupling to the polymer, are basically suitable as organosilicon compounds. The usual quantities of organosilicon compounds are 1 to 10% by weight, relative to the total quantity of precipitated silica.

Examples for these organosilicon compounds are:

Bis(3-triethoxysilylpropyl)tetrasulfane, bis(3-triethoxysilylpropyl)disulfane, vinyltrimethoxysilane, vinyltriethoxysilane, 3-mercaptopropyltrimethoxysilane, 3-mercaptopropyltriethoxy silane, 3-aminopropyltrimethoxysilane, 3-aminopropyltriethoxysilane. Other organosilicon compounds are described in WO 99/09036, EP 1108231, DE10137809, DE10163945, DE 10223658.

In a preferred embodiment of the invention bis(triethoxysilyl-propyl)tetrasulfane can be used as a silane.

The silica according to the present invention can be mixed into elastomer mixtures, tires or vulcanizable rubber mixtures as a reinforcing filler in quantities of 5 to 200 parts, relative to 100 parts rubber as powder, spherical product or granulate and with silane modification or without silane modification.

Rubber and elastomer mixtures should be regarded as equivalent in terms of the present invention.

Apart from mixtures, which contain exclusively the silicas according to the present invention, with the above-mentioned organosilanes as fillers, the elastomer and rubber mixtures can additionally be filled with one or several more or less reinforcing fillers.

The following materials can also be used as fillers:

Carbon blacks: The carbon blacks to be used here are produced according to the lampblack, furnace, or gas black process and have BET surface areas of 20 to 200 m$^2$/g, such as SAF, ISAF, HSAF, HAF, FEF, or GPF carbon blacks. The carbon blacks can also contain heteroatoms such as silicon.

Highly dispersed pyrogenic silicas produced, for example through flame hydrolysis of silicon halogenides. The silicas can also be present as mixed oxides with other metallic oxides such as Al, Mg, Ca, Ba, Zn, and titanium oxides.

Other commercial silicas

Synthetic silicates such as aluminum silicate, alkaline-earth silicates such as magnesium silicate or calcium silicate, with BET surface areas of 20 to 400 m$^2$/g and primary particle diameters of 10 to 400 nm.

Synthetic or natural aluminum oxides and hydroxides

Natural silicates such as kaolin and other naturally occurring silicon dioxide compounds.

Glass fiber and glass fiber products (mats, strands) or micro glass spheres.

Starch and modified starch types

Natural fillers such as clay and siliceous chalk.

The blend ratio here also, as with metering of the organosilanes, is aligned with the properties to be achieved in the finished rubber compound. A ratio of 5-95% between the silicas according to the present invention and the other above-mentioned fillers (also as a mixture) is conceivable and is also realized within this framework.

In a particularly preferred embodiment of the invention 10 to 150 parts by weight of silicas, consisting completely or partially of the silicas according to the invention, if required, together with 0 to 100 parts by weight of carbon black and 1 to 10 parts by weight of an organosilicon compound, each in relation to 100 parts by weight of rubber, can be used to manufacture the mixture.

Apart from the silicas according to the present invention, the organosilanes and other fillers, the elastomers form another important constituent of the rubber mixture. These could include elastomers, natural and synthetic, oil-extended or not, as single polymer or a blend with other rubbers such as natural rubber, polybutadiene (BR), polyisoprene (IR), styrene/butadiene copolymerisate with styrene contents of 1 to 60, preferably 2 to 50% by weight (SBR) in particular produced by the solvent polymerization process, butyl rubbers, isobutylene/isoprene copolymerisates (IIR), butadiene/acrylonitrile copolymers with acrylonitrile contents of 5 to 60, preferably 10 to 50% by weight (NBR), partially hydrogenated or completely hydrogenated NBR rubber (HNBR), ethylene/propylene/diene copolymerisates (EPDM), and mixtures of these rubbers.

The following additional rubbers also come into consideration for rubber mixtures with the above-mentioned rubbers: carboxyl rubbers, epoxide rubbers, trans-polypentenamer, halogenated butyl rubbers, rubbers from 2-chlorobutadiene, ethylene vinyl acetate copolymers, ethylene propylene copolymers, and optionally, chemical derivatives of natural rubber as well as modified natural rubbers.

Preferred synthetic rubbers are, for example, those described in W. Hofmann, "Kautschuktechnologie", Genter Verlag, Stuttgart 1980.

To manufacture the tires according to the invention especially anionic polymerized L-SBR rubbers (solvent SBR) with a glass transition temperature above −50° C. and their mixtures with diene rubbers are of interest.

The silicas according to the present invention, with and without silane, could be utilized in all rubber applications, such as for example molded bodies, tires, tire treads, conveyor belts, seals, V-belts, hoses, shoe soles, cable sheaths, roller coverings, damping elements, etc.

The incorporation of these silicas and the manufacture of the mixtures containing these silicas is generally carried out by a method commonly used in the rubber industry, namely on a closed mixer or open roll mill, preferably at a temperature of 80-200° C. The silica can be added as a powder, a spherical product or granulate. Here too the silicas according to the present invention do not differ from the known white fillers.

The rubber vulcanizates according to the invention can contain other rubber auxiliary agents in the usual dosages, such as reaction accelerators, anti-aging materials, thermal stabilizers, light protection agents, antioxidants, processing auxiliary agents, plasticizers, tackifiers, blowing agents, colorants, pigments, wax, extenders, organic acids, retarders, metallic oxides and activators such as triethanolamine, polyethylene glycol, hexantriol. These compounds are known in the rubber industry.

The rubber auxiliary agents can be used in known quantities, which can, among other things, be aligned towards the particular use. The usual quantities are, for example, quantities of 0.1 to 50% by weight in relation to the rubber. Sulfur or sulfur donating substances can be used as vulcanizing agents. The rubber mixtures according to the present invention can also contain vulcanization accelerants. Examples of suitable main accelerants are mercaptobenzthiazoles, sulfenamides, thiurams, dithiocarbamates in quantities of 0.5 to 3% by weight. Examples of co-accelerants are guanidienes, thioureas and thiocarbonates in quantities of 0.5 to 5% by weight. Sulfur can usually be used in quantities of 0.1 to 10% by weight, preferably 1 to 3% by weight in relation to rubber.

The silicas according to the present invention can be used in rubbers that can be vulcanized with accelerants and/or sulfur as well as peroxidically.

Vulcanization of the rubber mixtures according to the present invention can be carried out at temperatures of 100 to 200° C., preferably 130 to 180° C., if required also under pressure of 10 to 200 bar. The rubber can be mixed with the filler, if applicable, the rubber auxiliary agents and the organosilicon compound in known mixing aggregates such as rolling mills, closed mixers and mixer-extruders.

The highly dispersible, high surface area silicas according to the present invention have the advantage that they give the rubber vulcanizates an improved abrasion resistance due to the higher CTAB surface area. In addition, the dry handling is improved due to the higher dynamic rigidity at 0° C. and 60°

C. and the rolling resistance, illustrated by the reduced tan δ (60° C.) value, is reduced. In an analogy to carbon blacks, when these highly dispersible, high surface area silicas according to the present invention are used an improved cut & chip and chunking behavior is achieved (for definition and other embodiments, see "New insights into the tear mechanism" and references in this, presented at Tire Tech 2003 in Hamburg by Dr. W. Niedermeier).

The rubber mixture according to the present invention is especially suitable for the manufacture of tire treads with improved lower rolling resistance, improved wet and dry traction properties and good abrasion resistance compared to a similar rubber mixture with previously known silicas. These tread mixtures are especially suitable for high speed passenger vehicle and motor cycle tires, but also for tires for utility vehicles with reduced rolling resistance with good abrasion resistance and improved cut & chip and chunking behavior.

The silicas according to the present invention, without the addition of organosilicon compounds, in a blend with a typical tread carbon black are also suitable for improving the cut & chip behavior of construction, agricultural machine and mining vehicle tires.

To achieve a good set of values in a polymer mixture, dispersion of the precipitated silica in the matrix, the polymer, is very decisive. This can be estimated by the WK coefficient.

The curves show a first maximum in particle size distribution in the range of 1.0-100 μm and another maximum in the range of <1.0 μm. The peak in the 1.0-100 μm range shows the proportion of uncomminuted silica particles after ultrasound treatment. These fairly coarse particles are poorly dispersed in the rubber mixtures. The second peak with much smaller particle sizes (<1.0 μm) indicates that portion of silica particles which has been comminuted during ultrasound treatment. These very small particles are very well dispersed in rubber mixtures.

The WK coefficient is now the ratio of the peak level of the non-degradable particles (B), whose maximum is in the range 1.0-100 μm (B'), to the peak level of the degraded particles (A), whose maximum is in the range <1.0 μm (A').

The WK coefficient is thus a measure for the "degradability" (dispersibility) of the precipitated silica. A precipitated silica is all the more easily dispersible the smaller the wk coefficient is, i.e. the more particles are decomposed when incorporated into rubber.

The silicas according to the present invention have WK coefficients ≦3.4 preferably ≦3.0, particularly preferably ≦2.5. Known precipitated silicas have other WK coefficients and other maximums in the particle size distribution when measured with the Coulter LS 230, and are thus less dispersible.

The physicochemical data of the precipitated silicas according to the present invention are determined by the following methods:

Determining the Moisture of Silicas

According to this method on the basis of ISO 787-2 the volatile portions (herein referred to as moisture for simplicity) of silica are determined after 2 hours of drying at 105° C. This drying loss mainly comprises water moisture.

Execution 10 g of the pulverulent, spherical or granular silica are weighed precisely to 0.1 mg (weighed sample E) into a dry weighing bottle with ground glass cover (diameter 8 cm, height 3 cm). The sample is dried with the lid open for 2 h at 105±2° C. in a drying cabinet. The weighing bottle is then closed and cooled to room temperature in a desiccator with silica gel as a drying agent.

The weighed portion A is determined gravimetrically.

The moisture is determined in % according to ((E in g–A in g)*100%)/(E in g).

Determining the Modified Sears Number of Silicas

The modified Sears number (hereinafter referred to as Sears number $V_2$) as measure for the number of free hydroxyl groups can be determined through titration of silica with potassium hydroxide solution in the range of pH 6 to pH 9.

The following chemical reactions form the basis of the determination method, where "Si"—OH is used to symbolize a silanole group of the silica:

"Si"—OH+NaCl ⇨ "Si"—ONa+HCl

HCl+KOH ⇨ KCl+H$_2$O.

Execution 10.00 g of a pulverulent, spherical or granular silica with 5±1% moisture are ground for 60 seconds in the IKA M 20 universal mill (550 W; 20 000 rpm). If required, the moisture content of the initial substance must be adjusted by drying at 105° C. in the drying cabinet or by even humidifying. 2.50 g of the silica thus treated are weighed at room temperature into a 250 ml titrating vessel and mixed with 60.0 ml reagent grade methanol. After the sample is fully dispersed 40.0 ml deionized water are added and the whole is dispersed by means of Ultra Turrax T 25 (KV-18G agitator shaft, 18 mm diameter) for 30 seconds at a speed of 18 000 rpm. The sample particles adhering to the vessel edge and stirrer in the suspension are rinsed with 100 ml deionized water and tempered in a thermostatic water bath to 25° C.

The pH meter (by Knick, type: 766 Calimatic pH meter with temperature sensor) and the pH electrode (single-rod measuring chain by Schott, type N7680) are calibrated at room temperature using buffer solutions (pH 7.00 and 9.00). First, the starting pH value of the suspension at 25° C. is measured with the pH meter, and then depending on the outcome, it is adjusted with a potassium hydroxide solution (0.1 mol/l) or hydrochloric acid solution (0.1 mol/l) to a pH value of 6.00. The KOH or HCl solution consumption in ml up to pH 6.00 corresponds to $V_1'$.

After this 20.0 ml sodium chloride solution (250.00 g reagent grade NaCl filled with deionized water to 1 l) are added. Titration to pH 9.00 is continued with 0.1 mol/l KOH. The KOH solution consumption in ml up to pH 9.00 corresponds to $V_2'$.

Next the volumes $V_1'$, or $V_2'$ are first standardized to the theoretical weighed sample of 1 g and extended by five, resulting in $V_1$ and Sears number $V_2$ in ml/(5 g) units.

Determining the BET Surface Area

The specific nitrogen surface area (BET surface area in the following) of the pulverulent, spherical or granular silica is determined according to ISO 5794-1/Annex D with an AREA-meter (Ströhlein, JUWE).

Determining the CTAB Surface Area

The method is based on the adsorption of CTAB (N-Hexadecyl-N,N,N-trimethylammonium bromide) on the "outer" surface of the silica, which is described as the "rubber-effective surface", on the basis of ASTM 3765, or NFT 45-007 (chapter 5.12.1.3). The adsorption of CTAB is carried out in an aqueous solution while stirring and with ultrasound treatment. Superfluous, unadsorbed CTAB is determined by back titration with NDSS (dioctyl sodium sulfosuccinate solution, "aerosol OT" solution) with a titroprocessor, where the end point is given by the maximum opacity of the solution, and determined with a phototrode. The temperature during all the operations that are carried out is 23-25° C. to prevent the CTAB crystallizing out. The back titration is based on the following reaction equation:

Equipment

Titroprocessor METTLER Toledo, type DL 55 and titroprocessor METTLER Toledo, type DL 70, both equipped with: pH electrode, Mettler, type DG 111 and phototrode, Mettler, type DP 550

Polypropylene titration beaker 100 ml

Glass titration vessel, 150 ml with lid

Pressure filtration device, 100 ml content

Membrane filter made of cellulose nitrate, pore size 0.1 μm, 47 mm Ø, e.g. Whatman (Order No. 7181-004)

Reagents

The solutions of CTAB (0.015 mol/l in deionized water) and NDSS (0.00423 mol/l in deionized water) are purchased ready-to-use (Kraft, Duisburg, Germany: Order No. 6056.4700 CTAB solution 0.015 mol/l; Order No. 6057.4700 NDSS solution 0.00423 mol/l), kept at 25° C. and used within one month.

Execution

Blank Titration

The consumption of NDSS solution to titrate 5 ml CTAB solution must be tested 1× each day before each measuring series. To do this the phototrode is set at 1000±20 mV before titration is started (corresponds to a transparency of 100%).

Precisely 5.00 ml CTAB solution are pipetted into a titration beaker and 50.0 ml deionized water are added. While stirring, the titration is carried out with NDSS solution according to the measuring method known to the expert with the DL 55 titroprocessor until the solution achieves max. opacity. The consumption $V_I$ of NDSS solution is determined in ml. Every titration must be carried out as a triple determination.

Adsorption 10.0 g of the pulverulent, spherical or granulated silica with a moisture content of 5±2% (if required the moisture content is adjusted by drying at 105° C. in a drying cabinet or by even humidification) is comminuted in a mill (Krups, Model KM 75, Article No. 2030-70) for 30 seconds. Precisely 500.0 mg of the comminuted sample are transferred to a 150 ml titration vessel with a magnetic stirrer and precisely 100.0 ml CTAB solution are added. The titration vessel is closed with a lid and stirred for 15 minutes with a magnetic stirrer. Hydrophobic silicas are stirred with an Ultra Turrax T 25 stirrer (agitator shaft KV-18G, 18 mm diameter) at 18 000 rpm for maximum 1 min. until they are fully perfused. The titration vessel is screwed on to the titroprocessor DL 70 and the pH value of the suspension is adjusted to a value of 9±0.05 with KOH (0.1 mol/l). The suspension is then subjected to ultrasound for 4 minutes in the titration vessel in an ultrasound bath (Bandelin, Sonorex RK 106 S, 35 kHz) at 25° C. It is then immediately subjected to pressure filtration through a membrane filter with nitrogen pressure of 1.2 bar. The first runnings of 5 ml are discarded.

Titration 5.00 ml of the residual filtrate are pipetted into a 100 ml titration vessel and filled to 50.00 ml with deionized water. The titration beaker is screwed on to the titroprocessor DL 55 and, while stirring, the titration is carried out with NDSS solution until maximum opacity is achieved. The consumption $V_{II}$ of NDSS solution is determined in ml. Every opacity must be carried out as a triple determination.

Calculation

With the help of the measured values $V_I$=Consumption of NDSS solution in ml for the titration of the blank sample $V_{II}$ Consumption of NDSS solution in ml when the filtrate is used produces:

$V_I/V_{II}$=quantity of CTAB in the blank sample/still available quantity of CTAB in the filtrate sample.

Consequently, for the adsorbed quantity N of CTAB in g we get:

$$N=((V_I-V_{II})*5.5 \text{ g}*5 \text{ ml})/(V_I*1000 \text{ ml})$$

Since from 100 ml filtrate only 5 ml were titrated, 0.5 g silica with a defined moisture were used and the space requirement of 1 g CTAB is $578435*10^{-3}$ m$^2$, it follows that:

CTAB surface area (not water-corrected) in m$^2$/g= (N*20*578.435 m$^2$/g)/(0.5 g) and CTAB surface area (not water-corrected) in m$^2$/g=(($V_I$-$V_{II}$)*636.2785 m$^2$/g)/$V_I$.

The CTAB surface area is related to the water-free silica, which is why the following correction is made.

CTAB surface area in m$^2$/g=(CTAB surface area (not water-corrected) in m$^2$/g*100%)/(100%−moisture in %).

Determining DBP Absorption

The DBP absorption (DBP number), which is a measure for the absorptive capacity of the precipitated silica, is determined on the basis of DIN standard 53601 as follows Execution 12.50 g pulverulent or spherical silica with 0-10% moisture content (optionally the moisture content is adjusted by drying at 105° C. in the drying cabinet) are added to the kneading chamber (article number 279061) of the Brabender Absorptometer "E". In the case of granulates the screened fraction of 3.15 to 1 mm (stainless steel sieves by Retsch) is used (by gently pressing the granulates through the screen with 3.15 mm pore size using a plastic spatula). With constant stirring (rotational speed of kneader blades 125 rpm) dibutylphthalate is dropped through the "Dosimat Brabender T 90/50" at a rate of 4 ml/min into the mixture, at room temperature. Mixing takes place with only minimal power consumption and is observed with reference to the digital display. Towards the end of the determination the mixture becomes "pasty", which is indicated by means of a steep rise in the power consumption. When 600 digits are displayed (torque of 0.6 Nm) both the kneader and also the DBP metering are switched off by an electrical contact. The synchronous motor for DBP supply is coupled to a digital counter, so that DBP consumption can be read off in ml.

Evaluation

DBP absorption is indicated in g/(100 g) and calculated using the following formula from measured DBP usage. The density of DBP at 20° C. is typically 1.047 g/ml.

DBP absorption in g/(100 g)=((*DBP* usage in ml)* (density of *DBP* in g/ml)*100)/(12.5 g).

DBP absorption is defined for water-free, dried silica. When moist precipitated silicas are used the value is to be corrected by means of the following correction table. The corrected value corresponding to the water content is added to the experimentally determined DBP value; e.g. a water content of 5.8% would mean the addition of 33 g/(100 g) for DBP absorption.

Correction table for dibutylphthalate absorption -water-free-

| % water | .0 | .2 | .4 | .6 | .8 |
|---|---|---|---|---|---|
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determining WK Coefficient: Aggregate Size Distribution by Means of Laser Diffraction Sample Preparation If the silica to be determined is a granulate, then 5 g of the granular silica are added to a beaker and the coarse granulate pieces are crushed with a pestle but not pounded. 1.00 g of the crushed, pulverulent or spherical silica with 5±1% moisture content (optionally the moisture content is adjusted by drying at 105° C. in the drying cabinet or uniform humidifying), which was manufactured no more than 10 days beforehand, is weighed into a 30 ml centrifuge tube with a convex base (height 7 cm, diameter 3 cm, depth of convex bulging 1 cm) and mixed with 20.0 ml dispersion solution (hydrophilic silicas: 20.0 g sodium hexametaphosphate (by Baker) filled to 1000 ml with deionized water; hydrophobic silica: 200.0 ml reagent grade ethanol with 2.0 ml concentrated ammonia solution (25%) and 0.50 g Triton X-100 (by Merck) filled to 1000 ml with deionized water). Then the centrifuge tube is placed into a double-walled glass cooling vessel (80 ml volumetric capacity, height 9 cm, Ø 3.4 cm) with cold water connections for faucet water (20° C.) and the sample is treated for 270 s with an ultrasound finger (by Bandelin, type UW 2200 with Horn DH 13 G and diamond plate Ø 13 mm). For this 50% power and 80% pulse (corresponds to 0.8 s power and 0.2 s pause) is set on the power supply unit (Sonopuls, by Bandelin, type HD 2200) of the ultrasound finger. The water cooling ensures that the temperature increase of the suspensions is max. 8° C. Until the sample is added to the liquid module of the laser diffraction device within 15 minutes the suspension is stirred with a magnetic stirrer to prevent any sedimentation.

Execution

Prior to measuring, the laser diffraction unit LS 230 (by Coulter) and the liquid module (LS Variable Speed Fluid Module Plus with integrated ultrasound finger CV 181, by Coulter) is left to run warm for 2 h and the module (menu "Control/rinse") is rinsed for 10 min. In the task bar of the unit software the menu feature "Measurement" is used to select the file window "Calculate Opt. Model" and the refraction indices are defined in a .rtf file as follows: fluid refraction index B. I. Real=1.332; Material refraction index Real=1.46; Imaginary=0.1. In the file window "Measuring cycle" the pump speed is set to 26% and the ultrasound power of the integrated ultrasound finger CV 181 is set to 3. The points ultrasound "while sample is being added", "10 seconds before every measurement", and "during measurement" must be activated. In addition, the following features are selected in this file window: set offset measurement, adjustment, background measurement, adjust measurement concentration, input sample info, input measurement info, start 2 measurements, autom. rinse with PIDS data.

On completion of the calibration measuring with an LS Size Control G15 Standard (by Coulter) and background measuring, the samples are added. Suspended silica is added until such time as light absorption of 45-55% is achieved and the unit displays "OK".

Measuring is done at room temperature with the evaluation model of the .rtf file defined above. Three repeated tests each of 60 seconds with a wait time of 0 seconds of each silica sample are carried out.

From the raw data curve the software calculates the particle size distribution on the basis of volume distribution, taking into consideration the Mie theory and the optical model by Fraunhofer. Typically, a bimodal distribution curve is found with an A mode between 0-1 µm (maximum at approx. 0.2 µm) and a B mode between 1-100 µm (maximum at approx. 5 µm). According to FIG. 1 the WK coefficient can be determined from this and is given as an average value of six individual measurements.

pH Determination

The process based on DIN EN ISO 787-9 is used to determine the pH value of an aqueous suspension of silicas at 20° C. To do this an aqueous suspension of the sample to be investigated is prepared. After briefly shaking the suspension its pH value is determined with a previously calibrated pH meter.

Execution

Before the pH measurement is carried out, the pH meter (Knick, type: 766 Calimatic pH meter with temperature sensor) and the pH electrode (single-rod measuring chain by Schott, type N7680) are calibrated each day at 20° C. using buffer solutions. The calibration function should be chosen so that the two buffer solutions that are used include the expected pH value of the sample (buffer solutions with pH 4.00 and 7.00, pH 7.00 and pH 9.00 and if required pH 7.00 and 12.00). If granulate is used, first 20.0 g of silica are comminuted in a mill (Krups, model KM 75, article No. 2030-70) for 20 seconds.

5.00 g pulverulent or spherical silica with 5±1% moisture (if necessary the moisture is adjusted by drying at 105° C. in a drying cabinet or by even humidification before any necessary comminution) are weighed on precision scales to an accuracy of 0.01 g into a previously tared glass wide necked flask. 95.0 ml deionized water are added to the sample. The suspension is then shaken in the closed vessel at room temperature for 5 minutes using a mechanical shaker (Gerhardt, model LS10, 55 W, level 7). The pH value is measured immediately after the shaking process. To do this the electrode is first rinsed with deionized water, followed by a part of the suspension, and then it is submerged in the suspension. After a magnetic stirrer has been added to the suspension the pH measurement is carried out at a constant speed with a slight vortex formation in the suspension. When the pH meter shows a constant value the pH value is read from the display.

When hydrophobic silica is used the process is carried out in a similar manner, however, in this case 5.00 g of the sample that may have been comminuted with 5±1% moisture content is weighed on the precision scales to an accuracy of 0.01 g into a previously tared glass wide neck flask. 50.0 ml reaction grade methanol and 50.0 ml deionized water are added and the suspension is then shaken in the closed vessel at room temperature for 5 minutes using a mechanical shaker (Gerhardt, model LS10, 55 W, level 7). The pH value is measured while stirring the solution; however, this is done after exactly 5 min.

Determining the Solids Content of Filter Cake

According to this method the solids content of filter cake is determined by removing the volatile portions at 105° C.

Execution 100.00 g of the filter cake is weighed into a dry, tared porcelain dish (diameter 20 cm) (weighed portion E). If necessary the filter cake can be comminuted with a spatula, in order to achieve lumps no larger than 1 cm$^3$. The sample is dried in a drying cabinet at 105±2° C. until its weight is constant. The sample is then cooled to room temperature in a desiccator with silica gel as a drying agent. The weighed portion A is determined gravimetrically.

The solid content is determined in % according to 100%– (((E in g–A in g)*100%)/(E in g)).

Determining Electrical Conductivity

The electrical conductivity (EC) of silica is determined in an aqueous suspension.

Execution

If granulate is used, first 20.0 g of silica are comminuted in a mill (Krups, model KM 75, article No. 2030-70) for 20 seconds. 4.00 g pulverulent or spherical silica with 5±1% moisture content (if necessary the moisture is adjusted by drying at 105° C. in a drying cabinet or by even humidifying before any necessary comminution) are suspended in 50.0 ml deionized water and heated to 100° C. for 1 min. The sample which has been cooled to 20° C. is filled to exactly 100 ml and homogenized by shaking.

The measuring cell of the conductivity measuring device LF 530 (WTW) is rinsed with a small quantity of the sample before the measuring cell LTA01 is submerged in the suspension. The value that is shown on the display corresponds to the conductivity at 20° C., as the external temperature sensor TFK 530 carries out an automatic temperature compensation. This temperature coefficient as well as the cell constant k must be tested before every measuring series.

0.01 mol/l potassium chloride solution is used as a calibration solution (EC at 20° C.=1278 µS/cm).

The following examples are intended to explain the invention in more detail without limiting it to these examples.

EXAMPLE 1

43.8 l water and 0.01 kg water glass (density 1.348 kg/l, 27.1% $SiO_2$, 8.00% $Na_2O$) are introduced into a reactor made of high-quality stainless steel with propeller stirring gear and double shell heating.

Then, while stirring vigorously at 63° C. for 22 minutes, 14.21 l/h water glass and approx. 3.24 l/h sulfuric acid (density 1.40 kg/l, 50.6% $H_2SO_4$) are added. This sulfuric acid is metered in such a way that a pH of 9.0 (measured at room temperature) prevails in the reaction medium. The metering of the raw materials is interrupted for 60 minutes, the specified temperature is maintained and then 4.21 l/h water glass and approx. 3.24 l/h sulfuric acid are added for a further 45 minutes. This sulfuric acid is again metered in such a way that a pH of 9.0 (measured at room temperature) prevails in the reaction medium. The addition of water glass is stopped and the sulfuric acid is added until a pH of 3.3 (measured at room temperature) is achieved.

The suspension that is obtained in this manner is filtered as usual and rinsed with water. The filter cake with 18% solids content is liquefied with aqueous sulfuric acid and a shearing unit. The silica slurry with 16% solids content is then spray-dried.

The pulverulent product that is thus obtained has a BET surface area of 215 m$^2$/g, a CTAB surface area of 188 m$^2$/g, DBP absorption of 306 g/(100 g), a Sears number $V_2$ of 23.1 ml/(5 g) and conductivity of 590 µS/cm.

EXAMPLE 2

1415 l water and 0.67 kg water glass (density 1.343 kg/l, 27.3% $SiO_2$, 7.99% $Na_2O$) are introduced into a reactor made of high-quality stainless steel with propeller stirring gear and double shell heating.

Then, while stirring vigorously at 56° C. for 45 minutes, 4.715 kg/min water glass and approx. 0.598 kg/min sulfuric acid (density 1.84 kg/l, 96% $H_2SO_4$) are added. This sulfuric acid is metered in such a way that a pH of 9.0 (measured at room temperature) prevails in the reaction medium. The metering of the raw materials is interrupted for 60 minutes, the specified temperature is maintained and then 4.715 kg/min water glass and approx. 0.598 kg/min sulfuric acid are added for a further 80 minutes. This sulfuric acid is again metered in such a way that a pH of 9.0 (measured at room temperature) prevails in the reaction medium. The addition of water glass is stopped and the sulfuric acid is added until a pH of 3.3 (measured at room temperature) is achieved.

The suspension that is obtained in this manner is filtered as usual and rinsed with water. The filter cake with 21% solids content is spin-flash dried and granulated.

The pulverulent product that is thus obtained has a BET surface area of 250 m$^2$/g, a CTAB surface area of 190 m$^2$/g, DBP absorption of 313 g/(100 g), a Sears number $V_2$ of 25.2 ml/(5 g) and conductivity of 480 µS/cm.

EXAMPLE 3

Examining the silica according to the present invention from Example 1 in a solution SBR rubber mixture. As state-of-the-art the easily dispersible tire tread silica Ultrasil 7000 GR and the high surface area silica Zeosil 1205 MP were chosen. Ultrasil 7000 GR is an easily dispersible precipitated silica from Degussa AG with a CTAB surface area of 160±10 m$^2$/g. Zeosil 1205 MP is a high surface area silica from Rhodia with a CTAB surface area of 200±10 m$^2$/g.

The formulation used for the rubber mixtures that were used is shown in the following Table 1. The unit phr means percentage by weight in relation to 100 parts of the crude rubber that is used. The reference silica Ultrasil 7000 GR in mixture R1 was modified with 6.4 phr Si 69. In order to take account of the higher surface area of the reference silica 1205 MP and the silica according to the present invention, in mixtures R2 and A the silane quantity was increased to 8 phr and the quantity of sulfur was reduced accordingly. A sulfur correction is necessary corresponding to the sulfur content of the silane (H.-D. Luginsland, J. Fröhlich, A. Wehmeier, paper No. 59 presented at the ACS-Meeting, Apr. 24-27, 2001, Providence/R.I., USA).

The general process for manufacturing rubber mixtures and their vulcanizates is described in the book: "Rubber Technology Handbook", W. Hofmann, Hanser Verlag 1994.

TABLE 1

|  | -R1- | -R2- | -A- |
|---|---|---|---|
| 1st step |  |  |  |
| Buna VSL 5025-1 | 96 | 96 | 96 |
| Buna CB 24 | 30 | 30 | 30 |
| Ultrasil 7000 GR | 80 | — | — |
| Zeosil 1205 MP | — | 80 | — |
| Silica according to example 1 | — | — | 80 |
| Si 69 | 6.4 | 8.0 | 8.0 |
| ZnO | 2 | 2 | 2 |
| Stearic acid | 2 | 2 | 2 |
| Naftolen ZD | 10 | 10 | 10 |
| Vulkanox 4020 | 1.5 | 1.5 | 1.5 |
| Protektor G35P | 1 | 1 | 1 |
| 2nd step |  |  |  |
| Batch level 1 |  |  |  |
| 3rd step |  |  |  |
| Batch level 2 |  |  |  |
| Vulkacit D/C | 2.0 | 2.0 | 2.0 |
| Vulkacit CZ/EG | 1.5 | 1.5 | 1.5 |
| Perkazit TBZTD | 0.2 | 0.2 | 0.2 |
| Sulfur | 1.51 | 1.33 | 1.33 |

The polymer VSL 5025-1 is a solution polymerized SBR copolymer from Bayer AG with a styrene content of 25% by weight and a butadiene content of 75% by weight. The copolymer contains 37.5 phr oil and has a Mooney viscosity (ML 1+4/100° C.) of 50±4. The polymer Buna CB 24 is a cis 1,4-polybutadiene (neodymium type) from Bayer AG with cis 1,4 content of at least 97% and a Mooney viscosity of 44±5. Naftolen ZD from Chemetall is used as an aromatic oil. Vulkanox 4020 is 6PPD from Bayer AG and Protektor G35P is an antiozidant wax from HB-Fuller GmbH. Vulkacit D/C (DPG) and Vulkacit CZ/EG (CBS) are commercial products from Bayer AG. Perkazit TBZTD can be obtained from Akzo Chemie GmbH.

The rubber mixtures are produced in a closed mixer according to the procedure in Table 2.

TABLE 2

| Step 1: Settings | |
|---|---|
| Mixer | Werner & Pfleiderer E-Type |
| Speed | 70 min$^{-1}$ |
| Ram pressure | 5.5 bar |
| Volume | 1.58 l |
| Level of filling | 0.56 |
| Flow temperature | 80° C. |
| Mixing procedure | |
| 0 to 1 min | Buna VSL 5025-1 + Buna CB 24 |
| 1 to 3 min | ½ filler ZnO, Stearic acid, Naftolen ZD, Si 69 |
| 3 to 4 min | ½ filler, Vulkanox 4020, Protektor G35P |
| 4 min | Cleaning |
| 4 to 5 min | Mixing and discharging |
| Storage | 24 h at room temperature |
| Step 2: Settings | |
| Mixer | as in Step 1 apart from: |
| Speed | 80 min$^{-1}$ |
| Level of filling | 0.53 |

TABLE 2-continued

| Mixing procedure | |
|---|---|
| 0 to 2 min | Break up batch from step 1 |
| 2 to 5 min | Maintain batch temperature 140-150° C. by speed variation |
| 5 min | Discharge |
| Storage | 4 h at room temperature |
| Step 3: Settings | |
| Mixer | as in Step 1 apart from |
| Speed | 40 min$^{-1}$ |
| Level of filling | 0.51 |
| Flow temperature | 50° C. |
| Mixing procedure | |
| 0 to 2 min | Batch from step 2, Vulkacit D/C, Vulkacit CZ/EG, Perkazit TBZTD sulfur |
| 2 min | discharge and form sheet on laboratory mixing mill, (diameter 200 mm, length 450 mm, Flow temperature 50° C.) |
| Homogenize: | 3* left, 3* right cut and fold, and 8* with narrow roll nip (1 mm) and 3* with wide roll nip (3.5 mm), pass through and stretch sheet |

The methods for in-rubber testing are summarized in Table 3.

TABLE 3

| Physical tests | Standard/Conditions |
|---|---|
| ML 1 + 4, 100° C., 3rd step (-) | DIN 53523/3, ISO 667 |
| Vulcameter test, 165° C. | DIN 53529/3, ISO 6502 |
| Torque difference |  |
| Dmax − Dmin (dNm) |  |
| t10% and t90% (min) |  |
| Tensile test on ring, 23° C. | DIN 53504, ISO 37 |
| Tensile strength (MPa) |  |
| Yield strength (MPa) |  |
| Elongation at break (%) |  |
| Shore-A hardness, 23° C. (-) | DIN 53 505 |
| Ball Rebound (%) | DIN EN ISO 8307, Steel ball 19 mm, 28 g |
| Dispersion coefficient (%) | see text |
| Viscoelastic properties, 0 and 60° C., 16 Hz, 50 N preliminary force and 25 N amplitude force Measured value recording after 2 min test time, i.e. 2 min conditioning Complex module E* (MPa) Loss modulus tan δ (-) | DIN 53513, ISO 2856 |

The dispersion factor is determined light-optically. The determination can be carried out by the German Institute for Rubber Technology in Hanover/Germany. The process is also described in: H. Geisler, "Bestimmung der Mischgüte", presented at the DIK Workshop, 27-28 Nov. 1997, Hanover/Germany.

The mixtures are vulcanized for 15 min at 165° C. Table 4 shows the results of the rubber-technical test.

TABLE 4

|  | -R1- | -R2- | -A- |
|---|---|---|---|
| Crude mixture data |  |  |  |
| ML 1 + 4 | 60 | 82 | 69 |
| Dmax − Dmin | 16.4 | 19.0 | 17.8 |
| t10% | 1.5 | 0.7 | 1.5 |
| t90% | 7.4 | 6.7 | 8.6 |

TABLE 4-continued

|  | -R1- | -R2- | -A- |
|---|---|---|---|
| Vulcanizate data | | | |
| Tensile strength | 13.3 | 15.4 | 11.9 |
| Yield strength 100% | 1.8 | 3.0 | 2.2 |
| Yield strength 300% | 10.4 | 12.1 | 10.4 |
| Elongation at break | 350 | 350 | 330 |
| Shore-A hardness | 60 | 71 | 64 |
| Ball-Rebound, 60° C. | 60.9 | 56.2 | 60.6 |
| E* (0° C.) | 18.0 | 26.4 | 21.3 |
| E* (60° C.) | 7.7 | 8.8 | 8.9 |
| tan δ (0° C.) | 0.458 | 0.527 | 0.425 |
| tan δ (60° C.) | 0.122 | 0.145 | 0.118 |
| Dispersion coefficient | 98 | 81 | 98 |

As can be seen by the data in Table 4, because of the higher surface area of the silicas according to the present invention, the Mooney viscosity of Mixture A is slightly higher than R1, but still much better than the poorly processable reference mixture R2 with increased viscosity, which represents the state-of-the-art. The vulcanization characteristics (Dmax–Dmin, t90%, t10%) of mixtures R1 and A are very similar, which would suggest problem-free vulcanization, while mixture R2 exhibits a much shorter scorch time t10%. The yield strengths of R1 and A are comparable, while R2 has a much higher hardness and yield strength 100%, which shows a higher silica network due to the inferior dispersion. The advantages of mixture A compared to reference R1 can be seen in the increased dynamic moduluses E*(0° C.) and (60° C.). These higher rigidities are especially important for high speed passenger vehicle and motor cycle tires, as they are evidence of improved traction in dry conditions and higher cornering stability. In spite of the silica with higher CTAB surface area contained in mixture A, the tan δ (60° C.) value is, favorably, almost unchanged compared to mixture R1, which allows a similar rolling resistance to be forecast, while mixture R2, according to the state-of-the-art, has a significantly higher tan δ (60° C.) and thus a higher rolling resistance.

The good reinforcement in combination with the high CTAB surface area of the silicas according to the present invention enable improved road abrasion in mixture A. This improvement in road abrasion can also be achieved when the high surface area silicas according to the present invention are used in natural rubber mixtures, such as those used in truck tire tread mixtures. In particular in combination with a high surface area, high structure carbon black such as N 121, excellent road abrasion can be achieved in truck tires. Especially in this area an improvement in the cut & chip and chunking behavior is of special interest and can be implemented by using the high surface area silicas according to the present invention.

The invention claimed is:

1. A utility vehicle tire, a motor cycle tire or a high speed passenger tire comprising a precipitated silica which has the following properties:

| a BET surface area ranging from | 200-250 m²/g, |
|---|---|
| a CTAB surface area ranging from | 170-220 m²/g, |
| a DBP number ranging from | 305-400 g/(100 g), and |
| a Sears number V₂ ranging from | 23-35 ml/(5 g). |

2. The utility vehicle tire, motor cycle tire or high speed passenger tire as claimed in claim 1 which has a WK coefficient of less than or equal to 3.4, wherein the WK coefficient is the ratio of the peak height of particles that are not broken-down by ultrasound in the size range 1.0-100 μm to the peak height of the broken-down particles in the size range of less than 1.0 μm.

3. The utility vehicle tire, motor cycle tire or high speed passenger tire as claimed in claim 1, wherein the surface area of the precipitated silica is modified with one or more organosilanes of Formula I to III:

(I), (II), or (III), with the following meanings

B: —SCN, —SH, —Cl, —NH$_2$, —OC(O)CHCH$_2$—, —OC(O)C(CH$_3$)CH$_2$— (if q=1) or —Sw— (if q=2), wherein B is chemically bonded to Alk, R and R$^1$ are an aliphatic, olefinic, aromatic or arylaromatic radical having 2 to 30 C atoms, which can optionally be substituted by the following groups: hydroxyl, amino, alcoholate, cyanide, thiocyanide, halogen, sulfonic acid, sulfonic acid ester, thiol, benzoic acid, benzoic acid ester, carbonic acid, carbonic ester, acrylate, methacrylate or an organosilane radical, and where R and R has an identical or different meaning or substitution, n is 0, 1 or 2, Alk is a divalent unbranched or branched hydrocarbon radical having 1 to 6 carbon atoms, m is 0 or 1, Ar is an aryl radical having from 6 to 12 carbon atoms, which may be substituted by the following groups: hydroxyl, amino, alcoholate, cyanide, thiocyanide, halogen, sulfonic acid, sulfonic acid ester, thiol, benzoic acid, benzoic acid ester, carbonic acid, carbonic acid ester, acrylate, methacrylate or an organosilane radical, p is: is 0 or 1, wherein p and n are not simultaneously 0, q is 1 or 2, w is a number from 2 to 8, r is 1, 2 or 3, wherein r+n+m+p=4, Alkyl is a monovalent unbranched or branched saturated hydrocarbon radical with 1 to 20 carbon atoms, and Alkenyl is a monovalent unbranched or branched unsaturated hydrocarbon radical having from 2 to 20 carbon atoms.

4. The utility vehicle tire, motor cycle tire or high speed passenger tire as claimed in claim 1, wherein the Sears no. ranges from 26-35 ml/(5 g).

5. The utility vehicle tire, motor cycle tire or high speed passenger tire as claimed in claim 1, wherein the DBP no. ranges from 310-350 g/(100 g).

6. A utility vehicle tire, a motor cycle tire or a high speed passenger tire comprising a precipitated silica which has the following properties:

| a BET surface area ranging from | 200-250 m²/g, |
|---|---|
| a CTAB surface area ranging from | 170-300 m²/g, |
| a DBP number ranging from | 305-400 g/(100 g), and |
| a Sears number V₂ ranging from | 23-35 ml/(5 g). |

7. The utility vehicle tire, motor cycle tire or high speed passenger tire as claimed in claim 6 which has a WK coefficient of less than or equal to 3.4, wherein the WK coefficient is the ratio of the peak height of particles that are not broken-down by ultrasound in the size range 1.0-100 μm to the peak height of the broken-down particles in the size range of less than 1.0 μm.

8. The utility vehicle tire, motor cycle tire or high speed passenger tire as claimed in claim 6, wherein the surface area of the precipitated silica is modified with one or more organosilanes of Formula I to III:

$$[SiR^1_n(RO)_r(Alk)_m(Ar)_p]_q[B] \quad (I),$$

$$SiR^1_n(RO)_{3-n}(Alkyl) \quad (II),$$

or $$SiR^1_n(RO)_{3-n}(Alkenyl) \quad (III),$$

with the following meanings

B: —SCN, —SH, —Cl, —NH$_2$, —OC(O)CHCH$_2$—, —OC(O)C(CH$_3$)CH$_2$— (if q=1) or —S$_w$— (if q=2), wherein B is chemically bonded to Alk, R and R$^1$ are an aliphatic, olefinic, aromatic or arylaromatic radical having 2 to 30 C atoms, which can optionally be substituted by the following groups: hydroxyl, amino, alcoholate, cyanide, thiocyanide, halogen, sulfonic acid, sulfonic acid ester, thiol, benzoic acid, benzoic acid ester, carbonic acid, carbonic ester, acrylate, methacrylate or an organosilane radical, and where R and R has an identical or different meaning or substitution, n is 0, 1 or 2, Alk is a divalent unbranched or branched hydrocarbon radical having 1 to 6 carbon atoms, m is 0 or 1, Ar is an aryl radical having from 6 to 12 carbon atoms, which may be substituted by the following groups: hydroxyl, amino, alcoholate, cyanide, thiocyanide, halogen, sulfonic acid, sulfonic acid ester, thiol, benzoic acid, benzoic acid ester, carbonic acid, carbonic acid ester, acrylate, methacrylate or an organosilane radical, p is: is 0 or 1, wherein p and n are not simultaneously 0, q is 1 or 2, w is a number from 2 to 8, r is 1, 2 or 3, wherein r+n+m+p=4, Alkyl is a monovalent unbranched or branched saturated hydrocarbon radical with 1 to 20 carbon atoms, and Alkenyl is a monovalent unbranched or branched unsaturated hydrocarbon radical having from 2 to 20 carbon atoms.

9. The utility vehicle tire, motor cycle tire or high speed passenger tire as claimed in claim 6, wherein the Sears no. ranges from 26-35 ml/(5 g).

10. The utility vehicle tire, motor cycle tire or high speed passenger tire as claimed in claim 6, wherein the DBP no. ranges from 310-350 g/(100 g).

* * * * *